United States Patent [19]
Takeuchi

[11] Patent Number: 5,815,156
[45] Date of Patent: Sep. 29, 1998

[54] INTERACTIVE PICTURE PROVIDING METHOD

[75] Inventor: Akikazu Takeuchi, Kanagawa, Japan

[73] Assignee: Sony Corporation, Tokyo, Japan

[21] Appl. No.: 520,618

[22] Filed: Aug. 30, 1995

[30] Foreign Application Priority Data

Aug. 31, 1994 [JP] Japan .................................. 6-206286

[51] Int. Cl.$^6$ ................................................ G06T 17/00
[52] U.S. Cl. ..................... 345/419; 345/435; 395/200.33
[58] Field of Search .................. 395/119, 127, 395/135, 133, 806, 807, 173, 200.33, 200.49; 345/419, 427, 435, 433, 302, 473, 329–332; 463/32–33; 348/121–124

[56] References Cited

U.S. PATENT DOCUMENTS

| | | | |
|---|---|---|---|
| 5,315,709 | 5/1994 | Alston, Jr. et al. | 395/600 |
| 5,490,239 | 2/1996 | Myers | 395/129 |
| 5,546,584 | 8/1996 | Lundin et al. | 395/700 |
| 5,566,280 | 10/1996 | Fukui et al. | 395/119 |
| 5,588,104 | 12/1996 | Lanier et al. | 395/326 |
| 5,588,914 | 12/1996 | Adamczyk | 463/32 |
| 5,602,564 | 2/1997 | Iwamura et al. | 345/119 |
| 5,608,446 | 3/1997 | Carr et al. | 348/6 |
| 5,623,642 | 4/1997 | Katz et al. | 395/500 |
| 5,623,656 | 4/1997 | Lyons | 395/610 |
| 5,625,408 | 4/1997 | Matsugu et al. | 348/42 |
| 5,625,818 | 4/1997 | Zarmer et al. | 395/615 |
| 5,633,993 | 5/1997 | Redmann et al. | 395/119 |
| 5,634,004 | 5/1997 | Gopinath et al. | 395/200.02 |
| 5,634,053 | 5/1997 | Noble et al. | 395/604 |
| 5,635,979 | 6/1997 | Kostreski et al. | 348/13 |
| 5,659,691 | 8/1997 | Durward et al. | 395/329 |
| 5,675,721 | 10/1997 | Freedman et al. | 395/129 |

FOREIGN PATENT DOCUMENTS

| | | |
|---|---|---|
| 5-233779 | 9/1993 | Japan . |
| 2256567 | 12/1992 | United Kingdom . |

OTHER PUBLICATIONS

M. Pesce, "VRML–Browsing and Building Cyberspace," New Riders Publishing, Copyright 1995, pp. 43–81.

K. Matsuda et al, "Sony's Enhanced VRML Browser (Beta Version4B) –Cyber Passage Browser Manual," Software Library, Architecture Laboratories, Sony Corp., Sony Computer Science Laboratory, (date text was written and/or published is unknown), pp. 1–2, 1–13.

(List continued on next page.)

*Primary Examiner*—Joseph H. Feild
*Attorney, Agent, or Firm*—Limbach & Limbach L.L.P.

[57] ABSTRACT

An interactive picture providing method comprising the steps of preparing, in a server, three-dimensional pictures of a virtual reality space from predetermined positions; supplying data of a position in the virtual reality space from a user terminal to the server via a network; providing a picture of the virtual reality space corresponding to the position from the server to the user terminal via the network; providing, from the server to the user terminal, a part such as a background of the picture seen from a predetermined position in the virtual reality space; generating, in the user terminal, another part such as a foreground of the picture seen from the specified position in the virtual reality; and compositing and displaying, in the user terminal, the picture generated in the user terminal and the picture provided from the server. According to this method, efficient generation of pictures is achievable, and a high-definition picture can be provided to each of the user terminals at low cost.

5 Claims, 7 Drawing Sheets

OTHER PUBLICATIONS

Material Collected from the World Wide Web on Jun. 16, 1996: K. Matsuda et al, "Sony's Approach to Behavior and Scripting Aspects of VRML: An Object Oriented Perspective," Sony Computer Sciences Laboratory Inc. with Central Research Center, Sony Corp., (date text was written and/or published is unknown), pp. 1–6.

C. Morningstar et al, "The Lessons of Lucasfilm's Habitat," First Steps, Michael Benedikt (ED.), 1990 MIT Press, Cambridge, Mass., Address is: File:///C/My Documents/Lessons.HTML, pp. 1–13.

Material Collected from the World Wide Web on Jun. 23, 1996, (date text was written and/or published is unknown), Pages Include: HTTP://WWW.Communities.Com/Habitat.HTML, pp. 1–2; File:///C/My Documents/Descent.GIF, pp. 1; HTTP://WWW.Race.U–Tokyo.AC.JP/Race/TGM/Mud/Habitar.HTML, pp. 1–2; HTTP:/www.Netusa.Net/Shadow/Habitat/Habitat.HTML, pp. 1–2.

Material Collected from the World Wide Web on Jun. 21, 1996 (date text was written and/or published is unknown), Pages Include: HTTP://VS.Sony.CO.JP/VS–E/VS–TOP.HTML, pp. 1–2 ; HTTP: //VS.Sony.CO.JP/VS–E/Works/Browser/What.HTML, pp. 1–2; HTTP://VS.Sony-.CO.JP/VS–E/Works/Server/What.HTML, pp. 1–2; HTTP:/VS.Sony.CO.JP/VS–E/Info/Techinfo.HTML, pp. 1–3; HTTP://VS.Sony.CO.JP/VS–E/Info/FAQ/, pp. 1–5.

Proceedings of the INET/JENCS, 15–17 Jun. 1994, "Extending WWW to Support Platform Independent Virtual Worlds," D. Raggett, Hewlett Packard Laboratories, pp. 242–1 through 242–6.

Proceedings: Human Factors in Computing Systems, Monterey, CA, May 3–7, 1992, ACM Press, USA, pp. 329–334, C. Codella et al., "Interactive Simulation in a Multi–Person Virtual World".

Proceedings: Computer Animation, Geneva, Switzerland, Apr. 19–21, 1995, IEEE Comput. Soc. Press, USA, pp. 44–49, G. Singh et al., "Networked Virtual Worlds".

Fujitsu Scientific and Technical Journal, Japan, vol. 26, No. 3, Oct. 1990, pp. 197–206, K. Fukuda et al., "Hypermedia Personal Computer Communication System: Fujitsu Habitat".

Proceedings: Virtual Reality Annual International Symposium, Seattle, WA, Sep. 18–22, 1993, IEEE C. Soc. Press, USA, pp. 394–400, C. Carlsson et al., "Dive –A Multi–User Virtual Reality System".

Proceedings: Virtual Reality Annual International Symposium, Research Triangle Park, NC, Mar. 11–15, 1995, IEEE C. Soc. Press, USA, pp. 11–18, Q. Wang et al, "EM –An Environment Manager for Building Networked Virtual Environments".

Proceedings: Advances in Parallel and Distributed Simulation, Anaheim, CA, Jan. 23–25, 1991, vol. 23, No. 1, SCS, USA, pp. 104–111, C. Kanarick, "A Technical Overview and History of the Simnet Project".

Proceedings 1992 Symposium on Interactive 3D Graphics, 29 Mar. 1992 –1 Apr. 1992, New York, US, pp. 147–156, Zyda et al, "NPSNET: Constructing a 3D Virtual World".

Proceedings of the INET/JENC5, 15–17 Jun. 1994, Reston, VA, US, pp. 242/1–242/3, Raggett, "Extending WWW to Support Platform Independent Virtual Reality".

Communicating with Virtual Worlds, Proceedings of Computer Graphics International, 21–25 Jun. 1993, Tokyo, JP, pp. 41–49, Gigante et al, "Distributed, Multi–Person, Physically–Based Interaction in Virtual Worlds".

F I G. 7
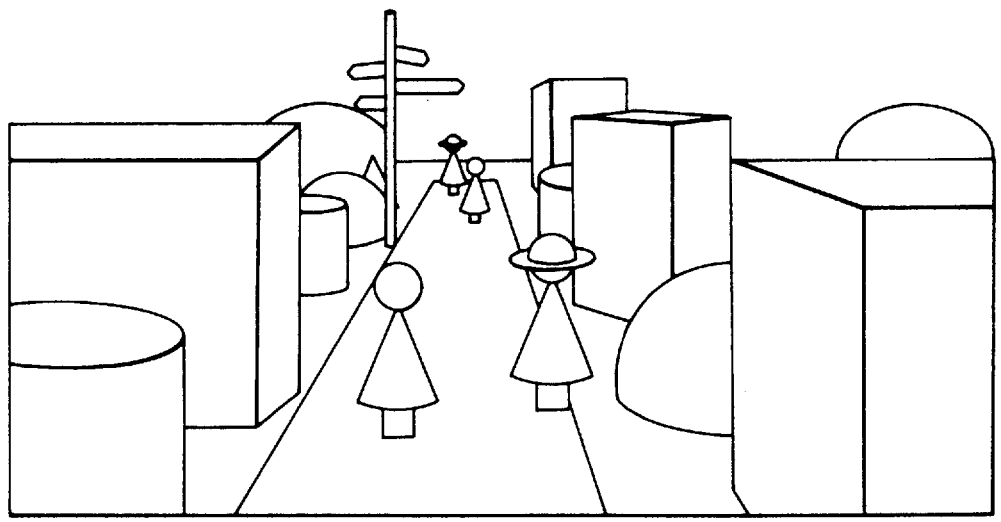

INTERACTIVE PICTURE PROVIDING METHOD

BACKGROUND OF THE INVENTION

1. Field of the Invention

The present invention relates to an interactive picture providing method adapted for use in accessing a server via a network from a user terminal to receive three-dimensional pictures which form a virtual reality space composed of computer graphics and video images.

2. Description of the Related Art

FIG. 8 shows an exemplary constitution of a system where a conventional interactive picture providing method is applied. An outline of such a system is disclosed in, e.g., Japanese Patent Laid-open No. Hei 5 (1993)-233779.

In FIG. 8, a server 10 for managing entire information inclusive of objects in a virtual world, attributes of users and so forth comprises a database 11 and a network interface 12. The database 11 manages the entire information in the server 10. And the network interface 12 constitutes an interface between a network 20 and the server 10.

The server 10 is connected via the network 20 to a multiplicity of user terminals 30.

The network 20 is capable of transmitting and receiving data bidirectionally, and it may be constructed by the use of two unidirectional networks.

Each of the user terminals 30 has a network interface 31 constituting an interface between the user terminal 30 and the network 20, and a CPU 32 for regulating all processes of the user terminal 30. A device controller 33 is so contrived as to take in the data of an action corresponding to a manipulation of a controller 34. Both the database information supplied from the network 20 and the action data taken in by the device controller 33 are stored in a storage unit 36. A drawing unit 35 locally generates picture data on the basis of the information stored in the storage unit 36 and then outputs the generated data to a display device 40 to display the same thereon.

Although merely a single user terminal 30 is shown in FIG. 8, a multiplicity of such user terminals 30, which are structurally the same, are connected to the server 10 via the network 20.

Assume now that three users play a car race by means of the respective user terminals 30 in a virtual reality space provided from the server 10. The server 10 manages the data of positions, speeds, directions and so forth of three cars and transmits the data to the three user terminals 30 periodically. In accordance with such data and the action data obtained by the manipulation of the individual user's controller 34, each user terminal 30 produces, in the drawing unit 35 thereof, an image at a visual point from the corresponding user's car and then outputs the image to the related display device 40 to display the same thereon.

And simultaneously, the action data obtained by the manipulation of the controller 34 is transmitted to the server 10 via the network 20. In response to the action data, the server 10 replaces the corresponding part in the managed data with this latest received data.

Thus, the multiple users can enjoy the car race in the virtual reality space in the manner mentioned above.

However, in the conventional interactive picture providing method known hereto-fore, there exists a problem that, since the picture to be displayed on the display device 40 in each user terminal 30 is generated by the drawing unit 35 in the user terminal 30, it is unavoidable that the cost of the user terminal 30 increases in improving the picture quality. Particularly in the case of realizing an exact drawing operation without clipping objects (pictures), which are far from a virtual position of the user terminal 30 and cause no interaction therebetween by the controller 34, it is necessary to enhance the drawing performance to consequently raise the production cost.

Furthermore, since the picture is generated in each user terminal 30, it follows that similar duplicate pictures are generated in the individual user terminals 30, signifying that considerably wasteful processing is executed in the system as a whole.

SUMMARY OF THE INVENTION

It is therefore an object of the present invention to achieve reduction in the cost of user terminals and to realize more efficient generation of pictures.

According to a first aspect of the present invention, there is an improvement in an interactive picture providing method which comprises the steps of preparing, in a server, three dimensional pictures of a virtual reality space from predetermined positions; supplying data of a position in the virtual reality space from a user terminal to the server via a network; and providing a picture of the virtual reality space corresponding to the position from the server to the user terminal via the network. The improvement further comprises the steps of providing, from the server to the user terminal, a part of the picture seen from a position in the virtual reality space; generating, in the user terminal, another part of the picture seen from the specified position in the virtual reality space; and compositing and displaying, in the user terminal, the picture generated in the user terminal and the picture provided from the server.

The picture provided from the server to the user terminal may be a background one of the picture seen from the position in the virtual reality space, and the picture generated by the user terminal may be a foreground one of the picture seen from the specified position in the virtual reality space.

In a case where the virtual reality space is divided into multiple partial worlds in such a manner that objects having high probability of causing an interaction are grouped together, the picture provided from the server to the user terminal may be a picture of a partial world seen from a predetermined visual point outside of the partial world.

According to a second aspect of the present invention, there is provided an improvement in an interactive picture providing method which comprises the steps of preparing, in a server, three-dimensional pictures of a virtual reality space from predetermined positions; supplying data of a position in the virtual reality space from a user terminal to the server via a network; and providing a picture of the virtual reality space corresponding to the position from the server to the user terminal via the network. The improvement further comprises the steps of dividing the virtual reality space into multiple partial worlds in such a manner that objects having high probability to cause an interaction are grouped together; providing, from the server to the user terminal, a picture of a partial world seen from a predetermined visual point outside of the partial world; and generating, in the user terminal, a picture corresponding to the specified position supplied from the user terminal, in accordance with a deviation of the specified position from the predetermined visual point.

In the interactive picture providing method according to the first aspect of the present invention, a picture such as a background one is generated in the server and is supplied to the user terminal. Meanwhile a picture such as a foreground one is generated in the user terminal. And thereafter the foreground picture and the background picture are composited in the user terminal. Accordingly, in comparison with the known case of generating the entire pictures in the user terminal, the method of the present invention is capable of simplifying the structure of the user terminal to consequently reduce the production cost thereof. Further, generation of pictures is rendered more efficient in the whole system since the background picture is generated in the server and is supplied to each user terminal.

In the interactive picture providing method according to the second aspect of the present invention, the virtual reality space is divided into multiple partial worlds in such a manner that objects having high probability to cause an interaction are grouped together. A picture seen from a predetermined visual point is prepared for each of the partial worlds, and the picture seen from the specified position is generated on the basis of the deviation from that visual point. This reduces the number of pictures to be generated, hence realizing lower-cost formation of the virtual reality space.

The above and other features and advantages of the present invention will become apparent from the following description which will be given with reference to the illustrative accompanying drawings.

BRIEF DESCRIPTION OF THE DRAWINGS

FIG. 7 illustrates a composite picture obtained by combining the pictures of FIGS. 5 and 6 with each other.

DESCRIPTION OF THE PREFERRED EMBODIMENTS

Figure 1:
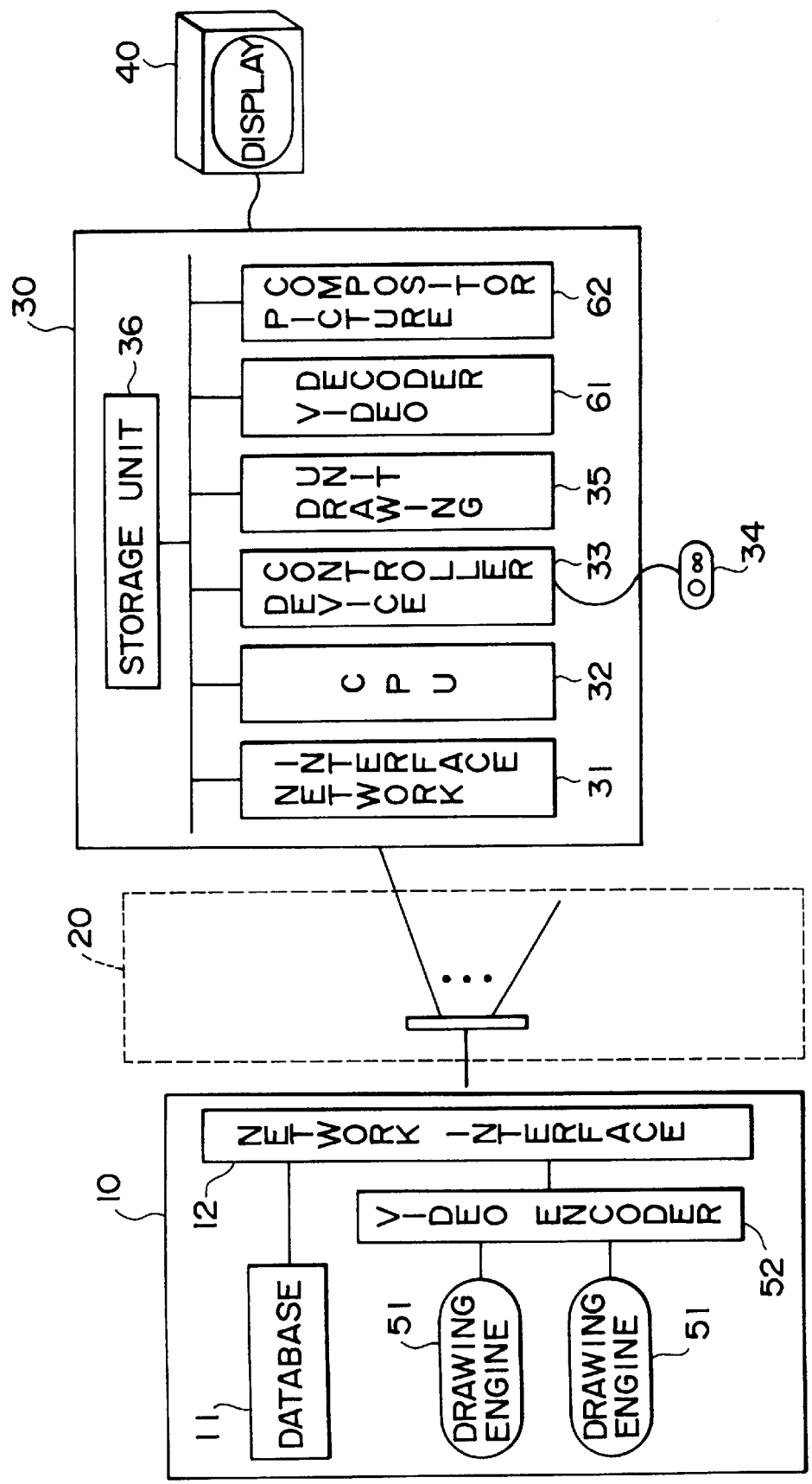
FIG. 1 is a block diagram showing a structural example of a cyberspace system to which an interactive picture providing method of the present invention is applied.
Figure 8:
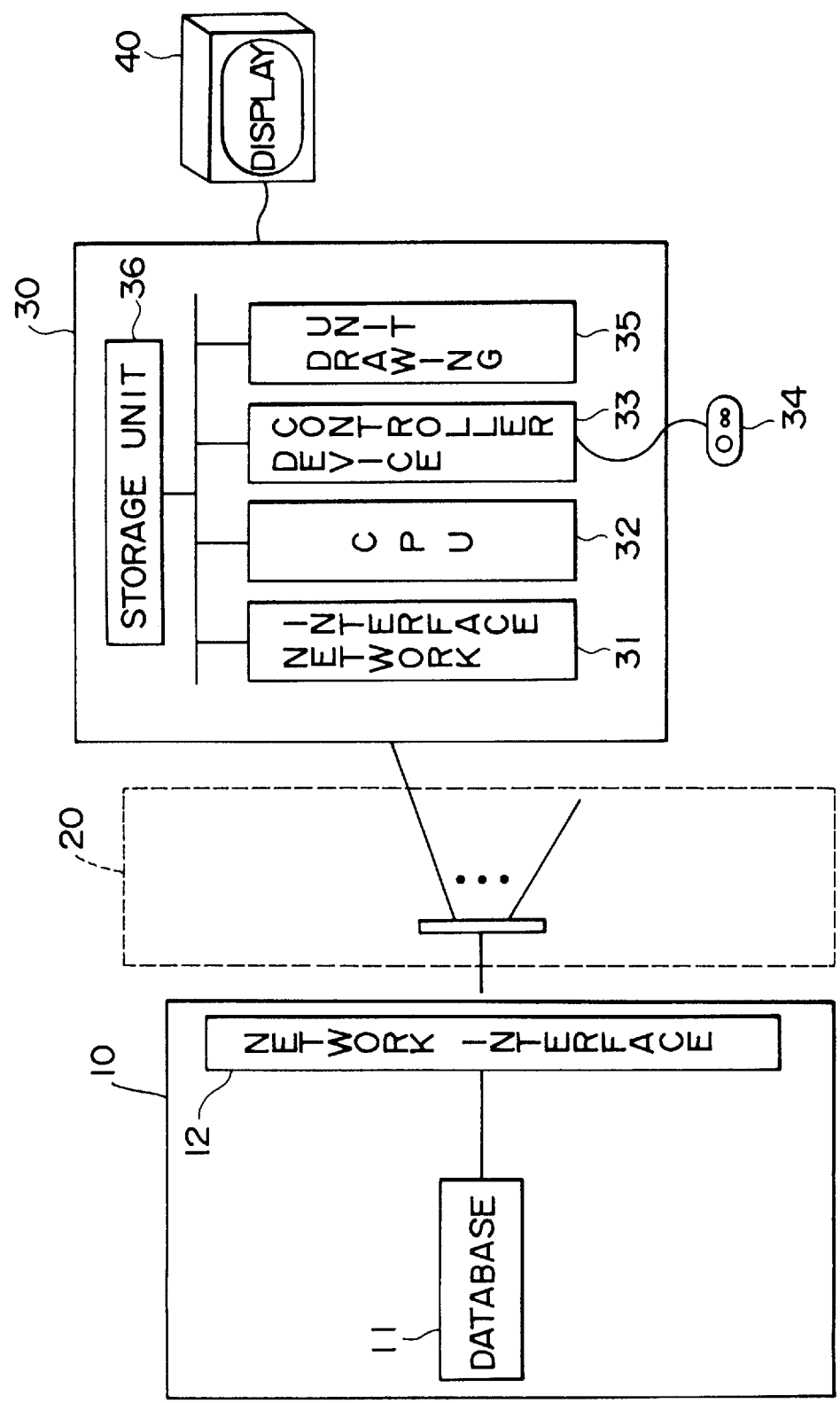
FIG. 8 is a block diagram showing a structural example of a cyberspace system to which a conventional interactive picture providing method of the prior art is applied.

FIG. 1 shows a structural example of a picture providing system (cyberspace system) to which the interactive picture providing method of the present invention is applied. In this diagram, any components corresponding to those shown in FIG. 8 are denoted by the same reference numerals.

In this embodiment, a server 10 has drawing engines 51 and a video encoder 52 in addition to a database 11 and a network interface 12. An arbitrary number (two in this embodiment) of drawing engines 51 generate three-dimensional picture data, which forms a virtual reality space, in accordance with the data stored in the database 11. The video encoder 52 is so arranged as to execute an encoding process to transmit the generated picture data from the drawing engines 51 to a user terminal 30 via a network 20.

Figure 2:
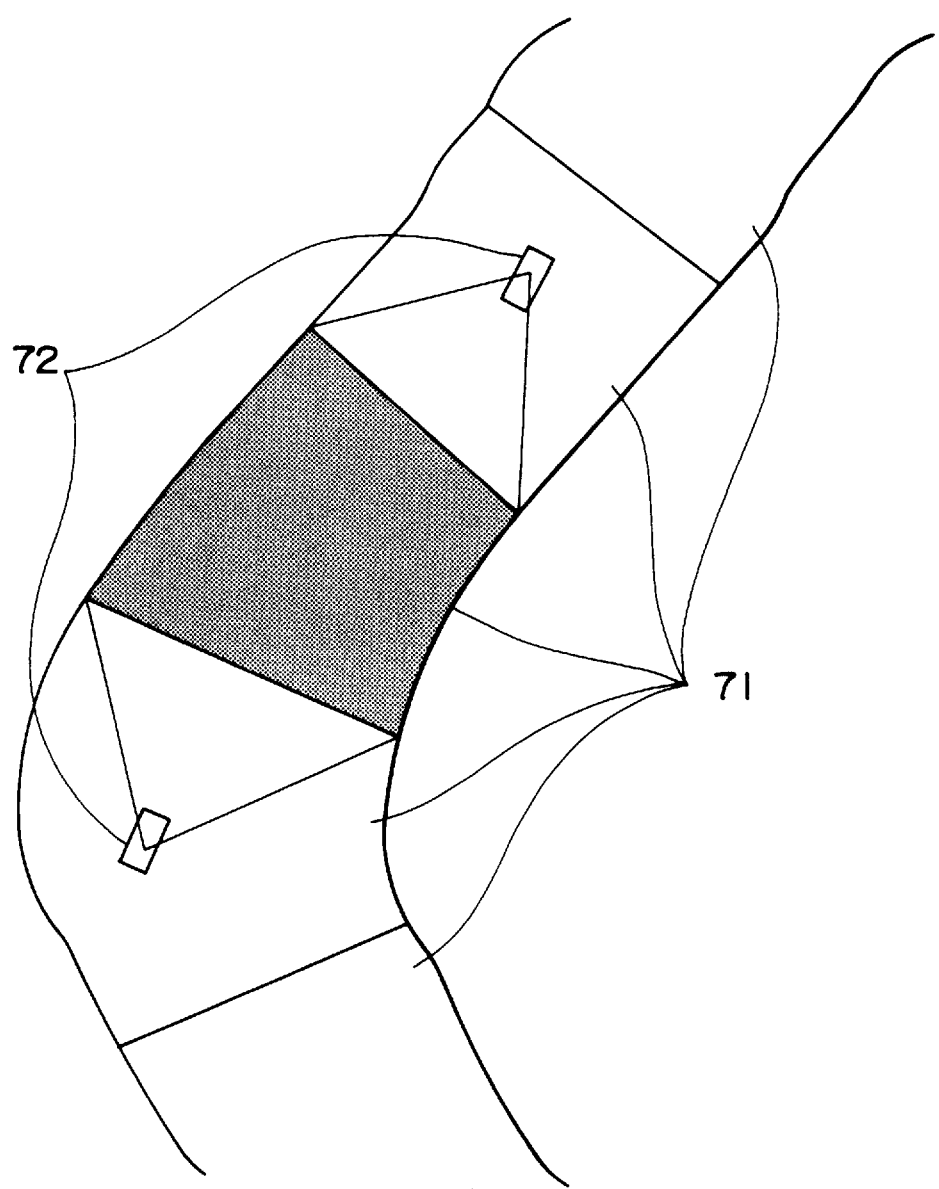
FIG. 2 illustrates division of a virtual reality space stored in a database included in FIG. 1.

In this embodiment, the database 11 stores the virtual reality space that is divided into multiple partial worlds as illustrated in FIG. 2 in such a manner that objects having high possibility (probability) to cause an interaction are grouped together. In this embodiment, a spatially continuous area of the virtual reality space divided as a unit. More specifically, a long and narrow space of the virtual reality world similar to a road is divided longitudinally into the partial worlds 71.

Thus, such division into the partial worlds enables provision of a natural and high-definition picture even when a character is moved to any visual point in the virtual reality space.

On the basis of the information obtained from the database 11, the drawing engines 51 generate pictures of each of such partial worlds 71 seen from predetermined visual points 72 which are anterior and posterior to the relevant partial world respectively and are spaced apart from each other by a fixed distance. A picture from some other point (position) than the above visual points 72 is generated in the user terminal 30 by geometrically transforming and modifying the picture seen from the visual point 72 in accordance with the positional deviation between such a point and the visual point 72.

The network interface 12 outputs to the network 20 the information read from the database 11 and also the data generated by the drawing engines 51 and encoded by the video encoder 52. The interface 12 further outputs to the database 11 the data transmitted from the user terminal 30 via the network 20.

The other components of the server 10 are the same as the aforementioned one in FIG. 8.

Meanwhile the user terminal 30 has a video decoder 61 and a picture compositor 62. The video decoder 61 is a device for reading and decoding the data encoded by the video encoder 52 of the server 10, then transmitted via the network 20 and stored once in the storage unit 36. The picture compositor 62 is a device for compositing the picture drawn by the drawing unit 35 with the picture decoded by the video decoder 61, and outputting the composite picture to the display device 40 to display the same thereon.

In compositing the picture generated by the drawing unit 35 with the picture reproduced by the video decoder 61, the picture compositor 62 has a function of exerting various effects on the two pictures so as to create a more natural picture. For example, the picture compositor 62 is capable of applying geometric transformation and modification to the decoded video image so as to approximate the image seen from the current visual point inputted from the controller 34 of the user terminal 30.

The other components of the user terminal 30 are fundamentally the same as the aforementioned one in FIG. 8.

Now referring to flow charts of FIGS. 3 and 4, an explanation will be given of the operation of the embodiment shown in FIG. 1.

Figure 3:
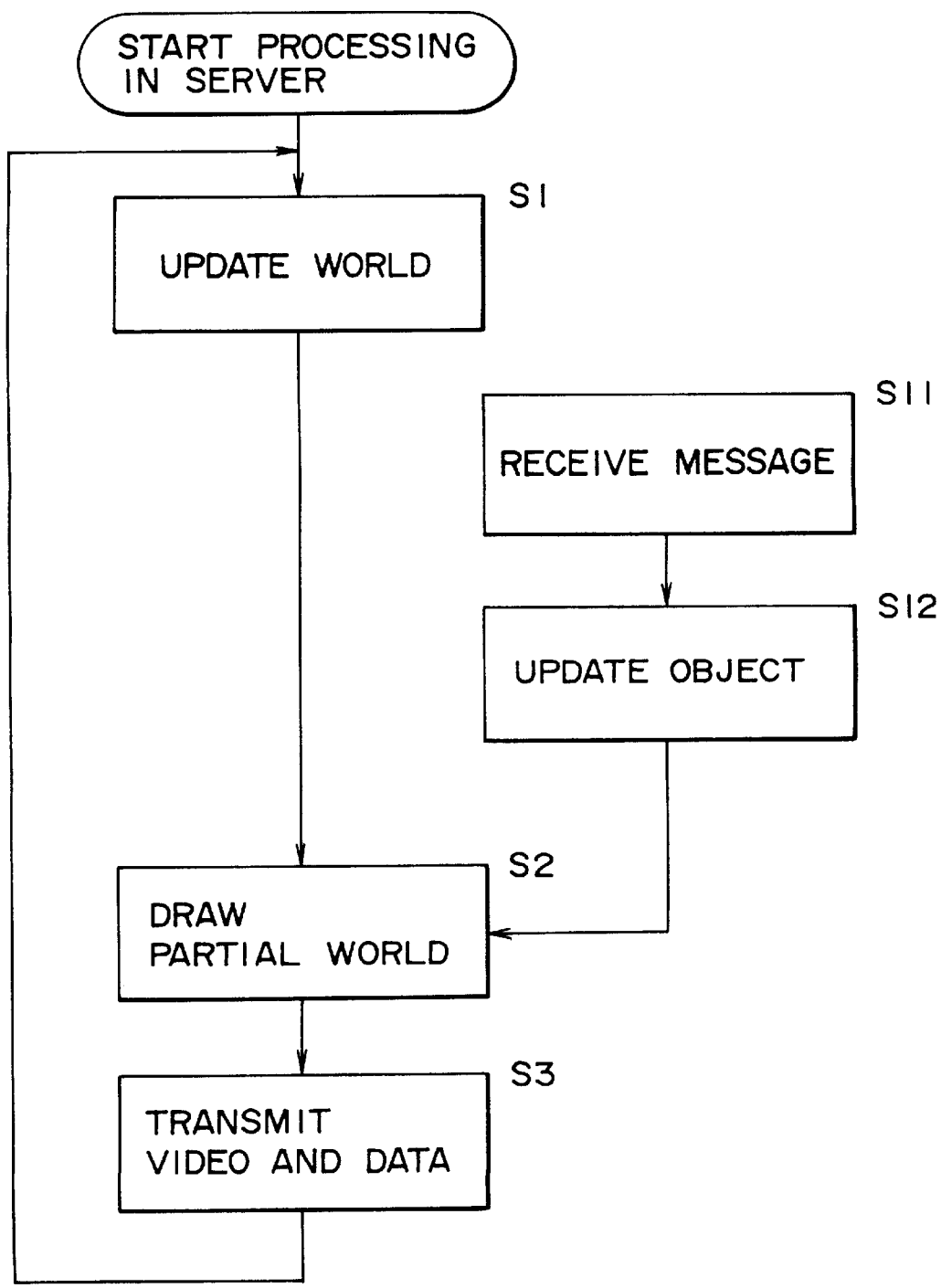
FIG. 3 is a flow chart for explaining a processing example of a server included in FIG. 1.

FIG. 3 shows a processing example of the server 10. First at step S1, there is executed a process of updating the environmental information that influences many objects, inclusive of time updating and light setting in the virtual reality space. Subsequently the operation proceeds to step S2, where the drawing engines 51 are driven to generate, in accordance with the content of the database 11, the pictures seen from the predetermined visual points 72 respectively with regard to the partial world 71.

Thereafter the operation proceeds to step S3, where the picture data generated by the drawing engines 51 are encoded by the video encoder 52 and then are sent to the network 20 via the network interface 12.

Concurrently with the processes described above, the server 10 receives the information as messages a synchronously from the multiple user terminals 30 at step S11. Then the operation proceeds to step S12, where the content of the data managed in the database 11 is updated in accordance with the messages thus received, so that the information of objects is updated. In this stage of the operation, the partial world 71, to which the objects belong, may be changed in some cases due to a corresponding positional change or the like input from the user terminal 30, and a process relative thereto is also executed.

Figure 4:
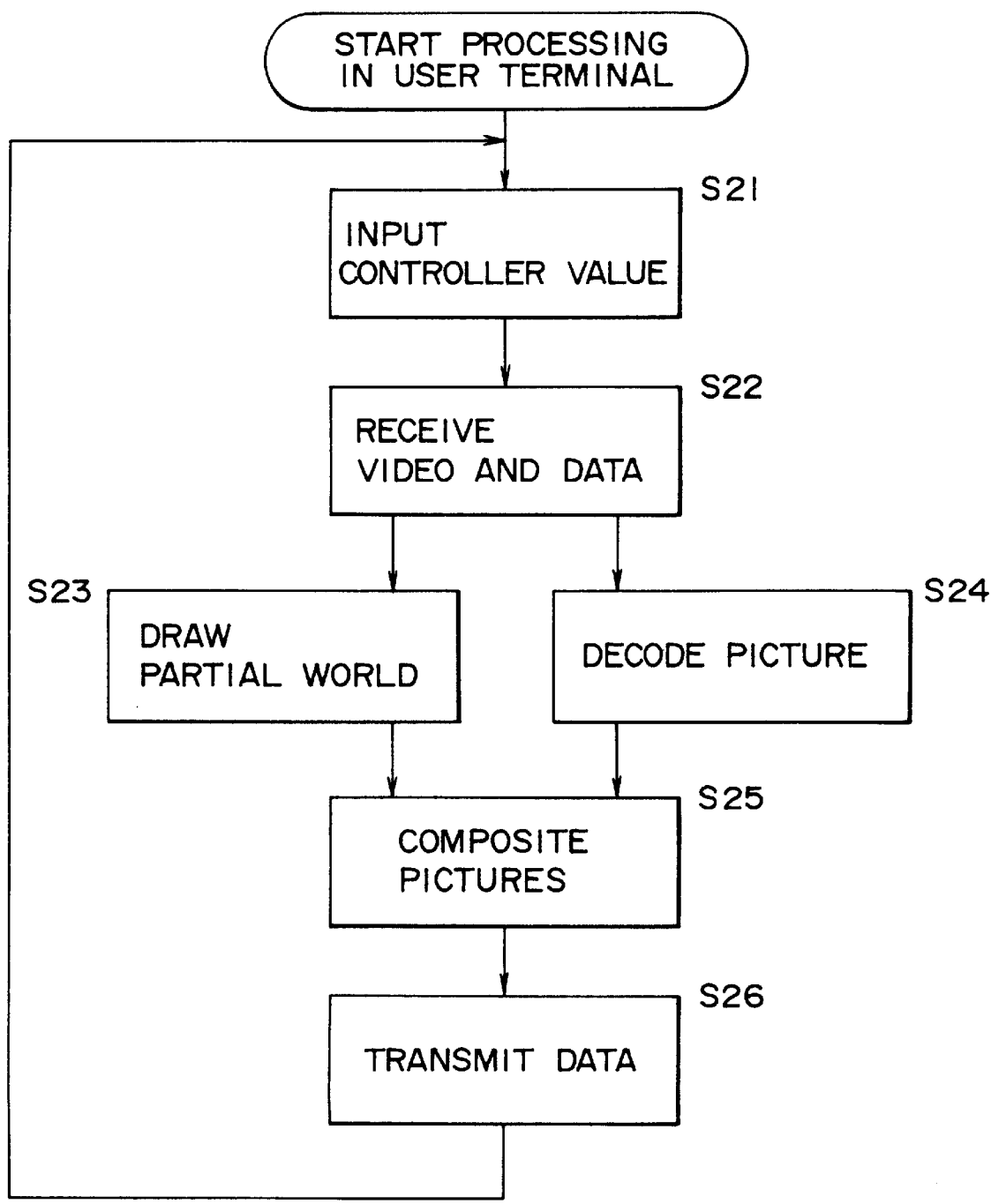
FIG. 4 is a flow chart for explaining a processing example of a user terminal included in FIG. 1.

In contrast with the above, FIG. 4 shows a processing example of the user terminal 30. First at step S21, the action data inputted by manipulation of the controller 34 by the user is acquired via the device controller 33. More specifically, each user manipulates the controller 34 and inputs the visual-point data (action data) of the character allocated to that user in the virtual reality space. Then the device controller 33 acquires the input data. The data thus acquired is then stored in the storage unit 36.

Subsequently the operation proceeds to step S22, where the network interface 31 receives the data from the server 10 via the network 20. As described, the data thus received includes two kinds, i.e., the data read from the database 11 and the video data drawn by the drawing engine 51 and encoded by the video encoder 52. Such data is then stored in the storage unit 36.

The video data included in the data stored in the storage unit 36 is read out therefrom at step S24 and then is supplied to the video decoder 61 to be decoded therein.

Meanwhile the data from the database 11 is read out from the storage unit 36 at step S23 and is inputted to the drawing unit 35. Then the drawing unit 35 locally generates picture data in conformity with the input data.

The processes at steps S23 and S24 are executed concurrently. Thereafter the operation proceeds to step S25 to execute a process of compositing the pictures. That is, the picture compositor 62 composites the picture decoded by the video decoder 61 with the picture generated by the drawing unit 35 after a required adequate transformation. The composite picture thus produced is supplied to the display device 40 to be displayed thereon.

Subsequently the operation proceeds to step S26, where the action data obtained from the controller 34 via the data controller 33 is read out from the storage unit 36 and then is transmitted to the server 10 via the network 20.

Thereafter the operation returns to step S21, and the ensuing processes are repeated similarly to the above.

Figure 5:
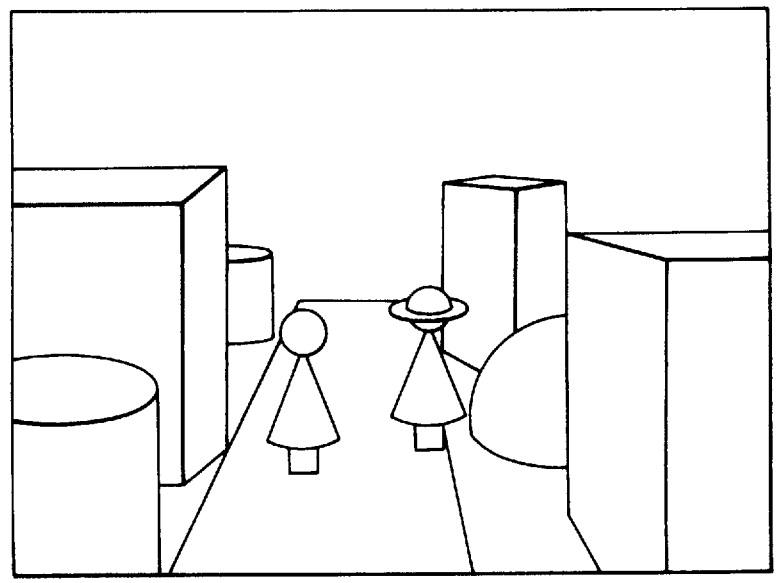
FIG. 5 illustrates an exemplary picture generated by the user terminal in FIG. 1.

FIG. 5 illustrates an exemplary foreground picture of the partial world 71 drawn by the drawing unit 35 at step S23 in FIG. 4.

Figure 6:
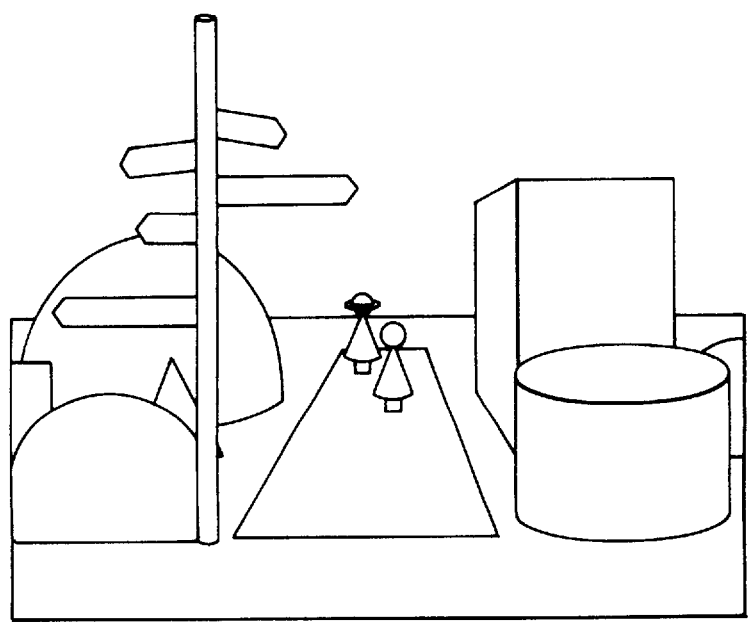
FIG. 6 illustrates an exemplary picture generated by the server in FIG. 1.

FIG. 6 illustrates an exemplary background picture of the partial world 71 generated by the drawing engine 51 of the server 10 at step S2 in FIG. 3 (i.e., the picture decoded by the video decoder 61 of the user terminal 30 at step S24 in FIG. 4).

FIG. 7 illustrates an exemplary composite picture obtained by combining the two pictures (the foreground picture illustrated in FIG. 5 and the background picture illustrated in FIG. 6) by the picture compositor 62 at step S25 in FIG. 4.

Although this embodiment is so contrived that the background picture is generated in the server 10 and the foreground picture is generated in the user terminal 30, it is possible to reverse the above arrangement. However, the background picture is generally kept almost unchanged regardless of any minute positional change of the user terminal 30, whereas the foreground picture is rendered widely different depending on a slight positional difference of the user terminal 30. Therefore, more efficient generation of pictures can be achieved in the whole system by a contrivance of generating the fore-ground picture in the user terminal 30 while generating the background picture in the server 10.

In the above embodiment, the video data generated in the server 10 is encoded and transmitted to the user terminal 30. However, it may be so modified that the video data is transmitted in the form of analog signal without being encoded. In another conceivable modification, the database information may be cached in the user terminal 30.

It is to be understood that, in the user terminal 30, the sequence of transmitting the data to or receiving the same from the network 20, and the sequence of receiving the data from the server 10, are not limited merely to the examples shown in FIGS. 3 and 4.

Furthermore, if the system is so constituted as to permit transmission of a video signal from the user terminal 30 to the server 10, it becomes possible to realize an advantage of transmitting the video signal from one user terminal 30 to the server 10 and then transmitting the same signal from the server 10 to the other user terminal.

As mentioned, in the interactive picture providing method according to one aspect of the present invention, a part of the picture seen from a predetermined position in the virtual reality space is generated in the server and is supplied to the user terminal, while another part of the picture seen from a specified position in the virtual reality space is generated in the user terminal, and thereafter both pictures are composited and displayed, so that a high-quality picture can be efficiently generated and displayed at low cost.

In the interactive picture providing method according to another aspect of the present invention, the virtual reality space is divided into multiple partial worlds in such a manner that congenial objects having high probability to cause an interaction are grouped together, and the picture of each partial world seen from a predetermined visual point outside of the partial world is provided from the server to the user terminal, hence realizing display of a high-quality picture in the user terminal more efficiently and at lower cost.

Although the present invention has been described hereinabove with reference to some preferred embodiments thereof, it is to be understood that the invention is not limited to such embodiments alone, and a variety of other modifications and variations will be apparent to those skilled in the art without departing from the spirit of the invention. The scope of the invention, therefore, is to be determined solely by the appended claims.

What is claimed is:

1. An interactive picture providing method comprising the steps of:

preparing, in a server, three-dimensional pictures of a virtual reality space from predetermined positions;

supplying data of a position in said virtual reality space from a user terminal to said server via a network;

providing a picture of said virtual reality space corresponding to the position from said server to said user terminal via said network;

providing, from said server to said user terminal, a part of the picture seen from a predetermined position in said virtual reality space;

generating, in said user terminal, another part of the picture seen from the specified position in said virtual reality; and compositing and displaying, in said user terminal, the picture generated in said user terminal and the picture provided from said server.

2. The interactive picture providing method according to claim 1, wherein the picture provided from said server to said user terminal is a background of the picture seen from the predetermined position in said virtual reality space, and the picture generated by said user terminal is a foreground of the picture seen from the specified position in said virtual reality space.

3. The interactive picture providing method according to claim 1 or 2, wherein the three-dimensional picture forming said virtual reality space is divided into multiple partial worlds in such a manner that objects having a high probability to cause an interaction are grouped together in the same partial world, and the picture provided from said server to said user terminal is a picture of the partial world containing the grouped together objects seen from a predetermined visual point outside of the partial world containing the grouped together objects.

4. The interactive picture providing method according to claim 1 or 2, wherein the three-dimensional picture forming the virtual reality space is divided into multiple partial worlds in such a manner that objects that a user of the system could expect to have a high probability of interacting with each other, are grouped together in the same partial world, and the picture provided from the server to the user terminal is a picture of the partial world containing the grouped together objects seen from a predetermined visual point outside of the partial world containing the grouped together objects.

5. An interactive picture providing method which comprises the steps of:

preparing, in a server, three dimensional pictures of a virtual reality space from predetermined positions, each predetermined position having a predetermined visual point;

supplying data of a position in said virtual reality space from a user terminal to said server via a network;

providing a picture of said virtual reality space corresponding to the position from said server to said user terminal via said network;

dividing said virtual reality space into multiple partial worlds in such a manner that objects having a high probability to cause an interaction are grouped together within the same partial world;

providing, from said server to said user terminal, a picture of a partial world containing grouped together objects seen from a predetermined visual point outside of the partial world containing grouped together objects; and generating, in said user terminal, a picture corresponding to the specified position supplied from said user terminal, in accordance with a deviation of the specified position from the predetermined visual point.

* * * * *